June 27, 1933. W. G. SMITH 1,915,804
ELECTRODYNAMIC PICK-UP
Filed Feb. 26, 1931 2 Sheets-Sheet 1
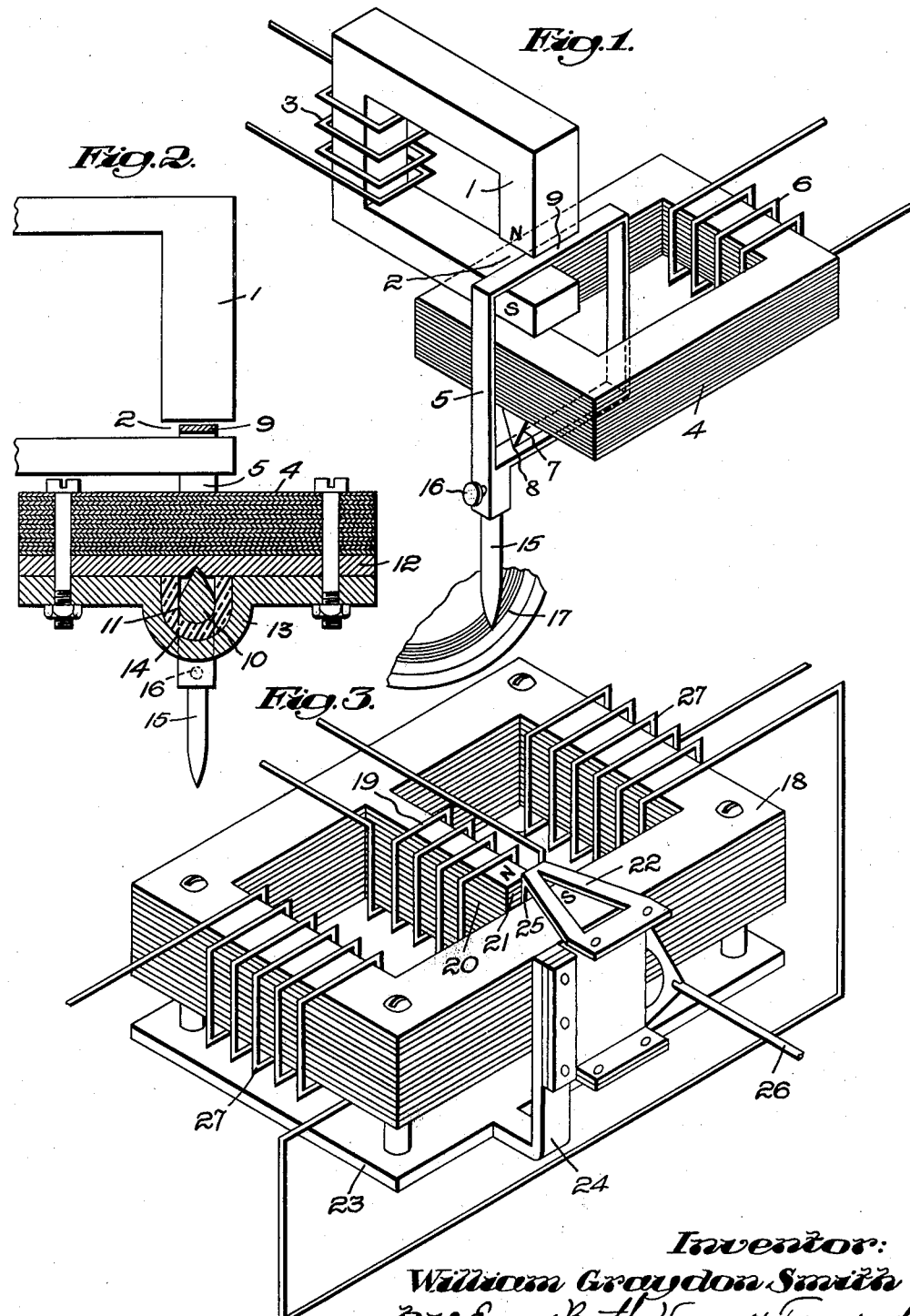

June 27, 1933.  W. G. SMITH  1,915,804
ELECTRODYNAMIC PICK-UP
Filed Feb. 26, 1931   2 Sheets-Sheet 2
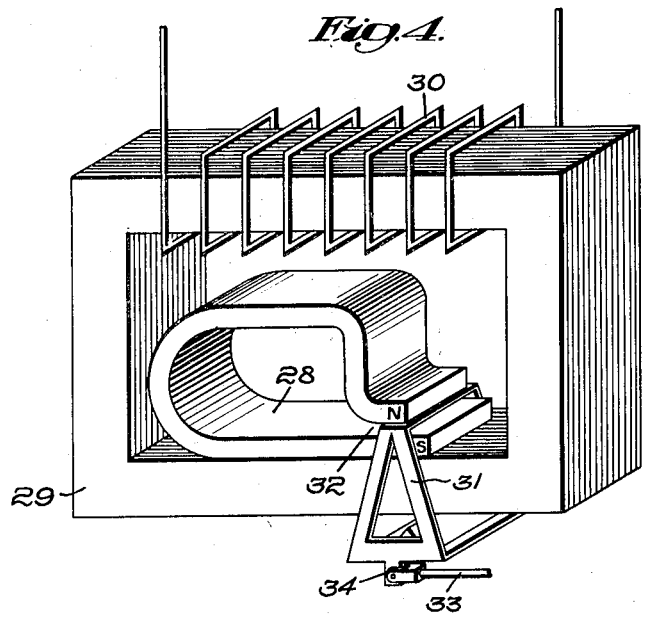
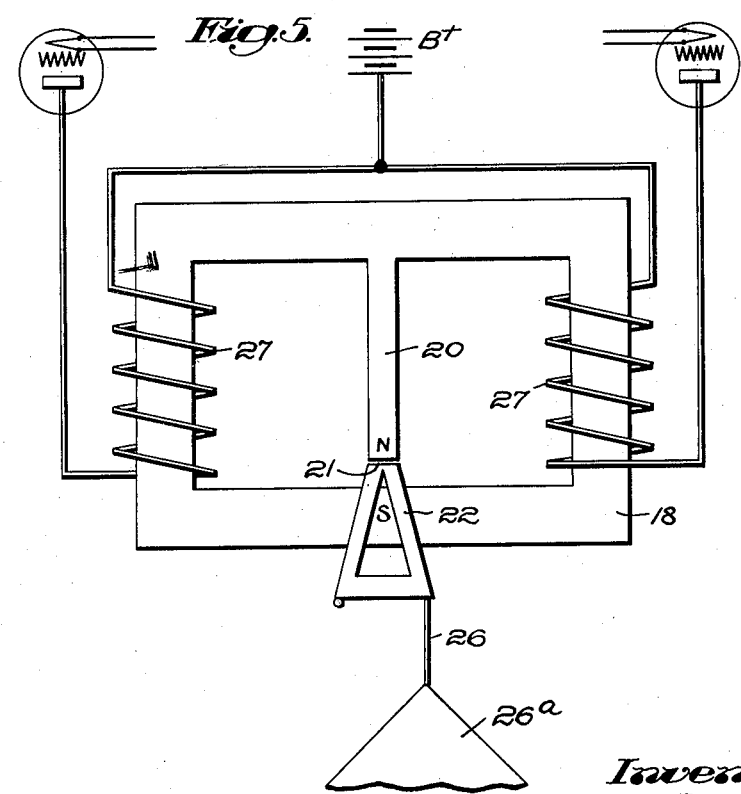

Patented June 27, 1933

1,915,804

UNITED STATES PATENT OFFICE

WILLIAM GRAYDON SMITH, OF MALDEN, MASSACHUSETTS, ASSIGNOR TO NATIONAL COMPANY, INC., OF MALDEN, MASSACHUSETTS, A CORPORATION OF MASSACHUSETTS

ELECTRODYNAMIC PICKUP

Application filed February 26, 1931. Serial No. 518,455.

My invention aims to provide improvements in a mechanism for the interchange of electrical and mechanical energy particularly, though not exclusively, for use in connection with so-called "phonograph pick-ups" and "loud speakers".

In the drawings which illustrate preferred embodiments of my invention:—

Figure 1 is a somewhat skeletonized view of my invention as applied to a "phonograph pick-up" device;

Fig. 2 is a side elevation of a portion of a "pick-up" device, the armature and supporting means being shown in cross-section;

Fig. 3 is a skeletonized view of my invention as applied to a "loud speaker" device;

Fig. 4 is a modified form of device showing a fixed magnet instead of an electromagnet; and Fig. 5 is another modification of my invention showing my device used as a "loud speaker" in combination with a "push-pull" amplifier.

Referring to the drawings, I have shown variously arranged elements which provide devices particularly adapted for use in connection with changing mechanical energy into electrical energy such, for instance, as is desired in connection with a "phonograph pick-up", as shown in Figs. 1 and 2. The same general elements may be used for the changing of electrical energy to mechanical energy such, for instance, as is desired for the operation of a "loud speaker". It should be understood that my device is generally adapted for use in connection with the recording and reproduction of audible signals and, therefore, I do not wish to be limited by this description or the drawings to any specific arrangement of the elements of my device.

The "phonograph pick-up" device illustrated rather generally in Figs. 1 and 2 of the drawings will be clearly understood by anyone skilled in the art. That device includes a magnet 1 formed to provide an air-gap 2 between the north and south poles marked N and S. In Figure 1, I have shown a field coil 3, thereby providing an electromagnet, although a permanent magnet may be used if desired, as shown in Fig. 4.

In conjunction with the electromagnet I have shown what amounts to a transformer comprising a core of laminated plates 4, a primary "winding" 5 and a secondary "winding" 6.

The low tension "winding" (in this particular instance the primary) or armature 5 is shown as being formed from a piece of flat sheet metal (such as silver, copper, or the like) formed to provide a rectangular loop which is mounted in any suitable manner so that one side of the loop may be permitted to move in the air-gap 2. In Figure 1, I have shown a triangular shaped piece 7 mounted beneath the core 4 and having an apex 8 bearing upon one side of the loop, thereby permitting the loop to swing about the apex 8 so that the side 9 of the loop may move in the air-gap 2 to cut the constant magnetic field. The mounting means shown in Fig. 2 differs from that shown in Fig. 1 and is more complete since it shows a triangular pivot 10 as being part of the "winding" 5 and has an apex 11 bearing against a plate 12 and held in position against the under side of the core by means of a yoke 13. A piece of rubber 14 is interposed between the yoke 13 and the pivot part 10 to hold the pivot part 10 in position against the plate 12, and to provide friction damping.

A phonograph needle 15 is carried by the "winding" 5 and held in place by the usual set screw 16, so that the loop 5 may be vibrated in the air-gap 2 by contact of the needle 15 with a rotating record 17 (Fig. 1). Thus the record supplies the mechanical energy for vibrating the loop 5 which constitutes the primary of the transformer.

During the operation of my device as a "phonograph pick-up" the moving coil or armature 5 moves about its pivot at the under side of the core 4 as the needle 15 is moved during the rotation of the record 17. Thus the side 9 of the "loop" 5 is vibrated in the air-gap 2 to cut the magnetic field between the poles of the magnet 1. This causes a voltage to be induced in the primary "winding" 5 which in turn causes a current to flow in the primary. That current causes a magnetic flux to traverse the transformer core 4 which in turn induces a voltage in the secondary 6. From this point on, the electrical energy passes through any well known circuit or apparatus to which a "loud speaker" or the like (not shown) is connected, as will be understood by those skilled in the art, thereby reproducing in sound the energy transmitted through the needle 15 from the record 17.

Referring now to Fig. 3, I have shown a device which is particularly adapted for use in connection with the interchange of electrical to mechanical energy thereby being useful in connection with dynamic and like "loud speakers". In this device the magnetic circuit for the field and for the transformer is provided by a single unit 18 made up of laminations in the form shown in Fig. 3. The field coil 19 surrounds the projection 20 which terminates a given distance from a side of the unit 18 to provide an air-gap 21 in which the low tension "winding" (in this particular case the secondary), "loop" or "armature" 22 may move as described with respect to the device shown in Figs. 1 and 2.

The supporting means comprises a plate 23 upon which the field and transformer core is supported and from this plate 23 extends an arm 24 to which the "armature" 22 is flexibly attached to permit movement of that side 25 of the "armature" 22 which is located in the air-gap 21. A rod or link 26 is connected to the "armature" 22 for movement therewith and that rod is connected in the usual manner with a "loud speaker" cone or disc, as shown in Fig. 5. Thus when the armature is vibrated in the air-gap the rod 26 is moved to vibrate by mechanical energy the disc or cone to which it is attached.

The high tension "winding" of the transformer (in this particular case the primary) is shown as being divided so that a portion is wound around one end of the core unit 18 and another portion is wound around the opposite end of the unit.

In the operation of the device shown in Fig. 3, the field is supplied by the direct current supplied from any suitable source to the field coil 19, while the audio frequency output of the amplifier or other suitable device (not shown) is supplied to the primary of the transformer. In this manner, the audio frequency current in the secondary 27 causes a magnetic flux in the core of the transformer so that a current flow is induced in the armature 22 causing it to move in the air-gap 21. This movement of the armature, because of its flexible mounting, causes a movement of the rod 26 thereby transforming the electrical to mechanical energy to produce a given result such, for instance, as the mechanical vibration of the disc or cone 26ᵃ (Fig. 5) of a "loud speaker".

In Fig. 4 I have shown a device for accomplishing the same results as that shown and described in Fig. 3, but by a more simple arrangement of elements. The device shown in Fig. 4 comprises a permanent magnet 28 instead of an electromagnet, as shown in Figs. 1 and 3. Therefore, the transformer is reduced to a simple unit comprising the core 29, the primary "winding" 30 and the secondary "winding" or armature 31 pivoted, in substantially the same manner as shown and described in connection with the device shown in Figs. 1 and 2, for operation in the air-gap 32 of the magnet 28. In this case the rod 33 which operates the speaker cone or disc is connected for operation to a tab 34 which forms a part of the armature unit and moves with it as the armature is vibrated in the air-gap 32.

The device shown in Fig. 5 is similar to that shown in Fig. 3 and like parts are given like reference numerals. In this device the field coil around the projection 20 is eliminated and only the tapped coil 27 is used. This coil is connected to the "B" current supply and to the plates of the tubes of a "push-pull" amplifier, as shown diagrammatically. Therefore, the coil 27 used in conjunction with the magnetic core unit 18 carries both the direct current component and the audio frequency component of the plate current of the output of the amplifier in such a manner that the direct current component supplies a steady field across the air-gap 21 and the audio frequency current energizes the moving coil or armature 22. The operation of the device is otherwise substantially the same as that shown and described in connection with Fig. 3. Thus I have provided a device which comprises the use of a single magnetic mass for both the audio frequency core and the field core. Furthermore, I have provided a single "winding" for use as both a field coil and a transformer coil and I have thereby eliminated the separate power supply commonly used to energize the field.

In each of the devices illustrated and described there is one feature which is common and that is the provision of means whereby a closed "loop" or "winding" is moved in a magnetic field and is linked in such a manner with a magnetic core that it can be energized by induction to produce motion or can be energized by motion to produce an electrical effect by induction.

I am aware of various types of phonograph "pick-ups" and magnetic and dynamic "loud speakers", but so far as I know none shows or suggests the use of a device for operation in a constant magnetic field, which device is in the form of closed electrical circuit and is substantially rigid in construction and is movable as a single unit. The drawings illustrate this device as being formed from sheet metal in the form of a rectangular loop. It should be understood, however, that I do not wish to be limited to the exact construction and arrangement shown, because my invention contemplates other constructions for this particular device. Therefore, the terms "winding", "loop" and "armature" are to be given a broad interpretation.

While I have illustrated and described preferred embodiments of my invention, I do not wish to be limited thereby, because the scope of my invention is best defined by the following claims.

I claim:

1. A mechanism for the interchange of electrical and mechanical energy which comprises, in combination, a magnet having a magnetic field air-gap, a transformer associated with said magnet and having a primary coil, a core and a secondary coil, said secondary coil comprising a relatively rigid loop unit forming a closed electrical circuit and being pivotally mounted at one side of the loop for movement of the opposite side only in said air-gap.

2. A device for use in connection with a phonograph, or the like, pick-up and reproducing mechanism comprising a magnet having a magnetic field air-gap, a transformer associated with said magnet wholly externally thereof and having a primary coil means pivoted relative to said magnet and having a portion only passing through the said air-gap and a needle holder carried by said coil means whereby when a needle is secured therein and is moved by a phonograph or like driving means the said coil means will be vibrated about its pivot thereby to vibrate said portion only of said coil means located in said gap for the purposes described.

3. A device for use in connection with radio and the like speaker devices comprising a magnet having a magnetic field air-gap, a transformer associated with said magnet and having a secondary coil means pivoted relative to said magnet and having a portion only passing through the said air-gap and a rod connected to that portion of said coil means externally of the air gap and adapted to be moved to and fro by said coil means when electrical energy moves said portion passing through the air-gap to vibrate said coil means about its pivot for the purposes described.

In testimony whereof, I have signed my name to this specification.

WILLIAM GRAYDON SMITH.